(12) United States Patent
Kim et al.

(10) Patent No.: US 9,332,074 B2
(45) Date of Patent: May 3, 2016

(54) MEMORY TO MEMORY COMMUNICATION AND STORAGE FOR HYBRID SYSTEMS

(75) Inventors: Moon J. Kim, Wappingers Falls, NY (US); Rajaram B. Krishnamurthy, Wappingers Falls, NY (US); James R. Moulic, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 1351 days.

(21) Appl. No.: 11/951,709

(22) Filed: Dec. 6, 2007

(65) Prior Publication Data
US 2009/0150555 A1 Jun. 11, 2009

(51) Int. Cl.
*G06F 15/16* (2006.01)
*G06F 12/00* (2006.01)
*H04L 29/08* (2006.01)
*G06F 3/06* (2006.01)

(52) U.S. Cl.
CPC ............ *H04L 67/1097* (2013.01); *G06F 3/064* (2013.01); *G06F 3/0605* (2013.01); *G06F 3/067* (2013.01); *G06F 3/0638* (2013.01)

(58) Field of Classification Search
CPC ..... H04L 67/1097; G06F 3/064; G06F 3/067; G06F 3/0605; G06F 3/0638
USPC ............. 709/224, 226, 231; 710/16; 711/161; 375/259
See application file for complete search history.

(56) References Cited

U.S. PATENT DOCUMENTS

| | | | |
|---|---|---|---|
| 4,517,593 A | 5/1985 | Keller et al. | |
| 4,893,188 A | 1/1990 | Murakami et al. | |
| 5,136,662 A | 8/1992 | Maruyama et al. | |
| 5,506,999 A | 4/1996 | Skillman et al. | |
| 5,621,811 A | 4/1997 | Roder et al. | |
| 5,659,630 A | 8/1997 | Forslund | |
| 5,721,883 A * | 2/1998 | Katsuo ...................... G06T 1/00 345/505 |
| 5,809,078 A * | 9/1998 | Tani ........................ H04L 49/90 365/194 |

(Continued)

FOREIGN PATENT DOCUMENTS

| | | |
|---|---|---|
| EP | 1345120 A2 | 9/2003 |
| JP | 2001503171 A | 3/2001 |
| WO | 0068884 A1 | 4/2000 |

OTHER PUBLICATIONS

Kim et al., U.S. Appl. No. 11/940,506, Office Action Communication, Nov. 2, 2009, 20 pages.

(Continued)

*Primary Examiner* — Viet Vu
*Assistant Examiner* — Michael A Chambers
(74) *Attorney, Agent, or Firm* — Lisa Ulrich; Hoffman Warnick LLC

(57) ABSTRACT

The present invention relates to memory to memory communication and storage for hybrid systems. Under the present invention, a data stream is received on a first computing device of a hybrid system. An attempt is made to store the data stream on the first computing device up to a per stream limit and a total storage limit of the first computing device. It is then determined whether to store at least a portion of the data stream on a second computing device of the hybrid system that is in communication with the first computing device. This decision is based on the per stream limit and the total storage limit of the first computing device as well as a per stream limit and a total storage limit of the second computing device. Thereafter, the at least a portion of the data stream and a control signal are communicated to the second computing device for storage.

24 Claims, 3 Drawing Sheets

(56) References Cited

U.S. PATENT DOCUMENTS

| | | | |
|---|---|---|---|
| 5,832,308 A * | 11/1998 | Nakamura | G06F 3/0601 710/52 |
| 5,956,081 A | 9/1999 | Katz et al. | |
| 6,023,637 A | 2/2000 | Liu et al. | |
| 6,025,854 A | 2/2000 | Hinz et al. | |
| 6,081,659 A | 6/2000 | Garza et al. | |
| 6,166,373 A | 12/2000 | Mao | |
| 6,215,898 B1 | 4/2001 | Woodfill et al. | |
| 6,404,902 B1 | 6/2002 | Takano et al. | |
| 6,456,737 B1 | 9/2002 | Woodfill et al. | |
| 6,487,619 B1 | 11/2002 | Takagi | |
| 6,549,992 B1 * | 4/2003 | Armangau | G06F 11/1456 707/999.202 |
| 6,567,622 B2 | 5/2003 | Phillips | |
| 6,647,415 B1 * | 11/2003 | Olarig | G06F 3/0608 709/224 |
| 6,661,931 B1 | 12/2003 | Kawada | |
| 6,671,397 B1 | 12/2003 | Mahon et al. | |
| 6,744,931 B2 | 6/2004 | Komiya et al. | |
| 6,825,943 B1 | 11/2004 | Barry et al. | |
| 6,829,378 B2 | 12/2004 | DiFilippo et al. | |
| 6,898,633 B1 | 5/2005 | Lyndersay et al. | |
| 6,898,634 B2 * | 5/2005 | Collins | G06F 3/0608 709/215 |
| 6,898,670 B2 | 5/2005 | Nahum | |
| 6,950,394 B1 | 9/2005 | Chou et al. | |
| 6,978,894 B2 | 12/2005 | Mundt | |
| 6,987,894 B2 | 1/2006 | Sasaki et al. | |
| 7,000,145 B2 | 2/2006 | Werner et al. | |
| 7,016,996 B1 | 3/2006 | Schober | |
| 7,043,745 B2 | 5/2006 | Nygren et al. | |
| 7,065,618 B1 * | 6/2006 | Ghemawat | G06F 17/30215 707/999.201 |
| 7,076,569 B1 | 7/2006 | Bailey et al. | |
| 7,095,882 B2 | 8/2006 | Akahori | |
| 7,102,777 B2 | 9/2006 | Haraguchi | |
| 7,106,895 B1 | 9/2006 | Goldberg et al. | |
| 7,142,725 B2 | 11/2006 | Komiya et al. | |
| 7,171,036 B1 | 1/2007 | Liu et al. | |
| 7,225,324 B2 | 5/2007 | Huppenthal et al. | |
| 7,243,116 B2 * | 7/2007 | Suzuki | G06F 3/0605 707/640 |
| 7,299,322 B2 * | 11/2007 | Hosouchi | G06F 3/0605 711/111 |
| 7,327,889 B1 | 2/2008 | Imai et al. | |
| 7,430,622 B1 | 9/2008 | Owen | |
| 7,480,441 B2 | 1/2009 | Klausberger et al. | |
| 7,523,148 B2 * | 4/2009 | Suzuki | G06F 3/0605 |
| 7,602,394 B2 | 10/2009 | Seki et al. | |
| 7,605,818 B2 | 10/2009 | Nagao et al. | |
| 7,743,087 B1 | 6/2010 | Anderson et al. | |
| 7,801,895 B2 | 9/2010 | Hepper et al. | |
| 7,971,011 B2 * | 6/2011 | Furukawa | G06F 11/2064 707/658 |
| 8,052,272 B2 | 11/2011 | Smith et al. | |
| 8,078,837 B2 | 12/2011 | Kajihara | |
| 8,086,660 B2 | 12/2011 | Smith | |
| 8,094,157 B1 | 1/2012 | Le Grand | |
| 2002/0002636 A1 | 1/2002 | Vange et al. | |
| 2002/0004816 A1 | 1/2002 | Vange et al. | |
| 2002/0129216 A1 * | 9/2002 | Collins | G06F 3/0608 711/170 |
| 2002/0164059 A1 | 11/2002 | DiFilippo et al. | |
| 2002/0198371 A1 | 12/2002 | Wang | |
| 2003/0031355 A1 | 2/2003 | Nagatsuka | |
| 2003/0053118 A1 | 3/2003 | Muramoto et al. | |
| 2003/0092980 A1 | 5/2003 | Nitz | |
| 2003/0113034 A1 | 6/2003 | Komiya et al. | |
| 2004/0024810 A1 * | 2/2004 | Choubey | H04L 51/00 709/203 |
| 2004/0062265 A1 * | 4/2004 | Poledna | G06F 11/1482 370/442 |
| 2004/0062454 A1 | 4/2004 | Komiya et al. | |
| 2004/0091243 A1 | 5/2004 | Theriault et al. | |
| 2004/0122790 A1 | 6/2004 | Walker et al. | |
| 2004/0143631 A1 | 7/2004 | Banerjee et al. | |
| 2004/0153751 A1 | 8/2004 | Marshal et al. | |
| 2004/0156546 A1 | 8/2004 | Kloth | |
| 2004/0170313 A1 | 9/2004 | Nakano et al. | |
| 2004/0186371 A1 | 9/2004 | Toda | |
| 2004/0217956 A1 | 11/2004 | Besl et al. | |
| 2004/0228515 A1 | 11/2004 | Okabe et al. | |
| 2004/0233036 A1 | 11/2004 | Sefton | |
| 2004/0252467 A1 | 12/2004 | Dobbs et al. | |
| 2005/0013960 A1 | 1/2005 | Ozeki et al. | |
| 2005/0022038 A1 | 1/2005 | Kaushik et al. | |
| 2005/0044132 A1 | 2/2005 | Campbell et al. | |
| 2005/0063575 A1 | 3/2005 | Ma et al. | |
| 2005/0080928 A1 | 4/2005 | Beverly et al. | |
| 2005/0083338 A1 | 4/2005 | Yun et al. | |
| 2005/0084137 A1 | 4/2005 | Kim et al. | |
| 2005/0093990 A1 | 5/2005 | Aoyama | |
| 2005/0113960 A1 | 5/2005 | Karau et al. | |
| 2005/0126505 A1 | 6/2005 | Gallager et al. | |
| 2005/0219253 A1 | 10/2005 | Piazza et al. | |
| 2005/0259866 A1 | 11/2005 | Jacobs et al. | |
| 2005/0263678 A1 | 12/2005 | Arakawa | |
| 2006/0013473 A1 | 1/2006 | Woodfill et al. | |
| 2006/0047794 A1 | 3/2006 | Jezierski | |
| 2006/0117238 A1 | 6/2006 | DeVries et al. | |
| 2006/0135117 A1 | 6/2006 | Laumen et al. | |
| 2006/0149798 A1 | 7/2006 | Yamagami | |
| 2006/0155805 A1 | 7/2006 | Kim | |
| 2006/0171452 A1 | 8/2006 | Waehner | |
| 2006/0184296 A1 | 8/2006 | Voeller et al. | |
| 2006/0190627 A1 | 8/2006 | Wu et al. | |
| 2006/0235863 A1 * | 10/2006 | Khan | H04L 41/0843 |
| 2006/0239194 A1 * | 10/2006 | Chapell | H04L 12/5693 370/235 |
| 2006/0250514 A1 | 11/2006 | Inoue et al. | |
| 2006/0268357 A1 | 11/2006 | Vook et al. | |
| 2006/0269119 A1 | 11/2006 | Goldberg et al. | |
| 2006/0274971 A1 | 12/2006 | Kumazawa et al. | |
| 2006/0279750 A1 | 12/2006 | Ha | |
| 2007/0126744 A1 * | 6/2007 | Tsutsumi | G06F 12/0895 345/520 |
| 2007/0146491 A1 | 6/2007 | Tremblay et al. | |
| 2007/0159642 A1 | 7/2007 | Choi | |
| 2007/0229888 A1 | 10/2007 | Matsui | |
| 2007/0245097 A1 | 10/2007 | Gschwind et al. | |
| 2007/0250519 A1 | 10/2007 | Fineberg et al. | |
| 2008/0013862 A1 | 1/2008 | Isaka et al. | |
| 2008/0036780 A1 | 2/2008 | Liang et al. | |
| 2008/0063387 A1 | 3/2008 | Yahata et al. | |
| 2008/0092744 A1 | 4/2008 | Storbo et al. | |
| 2008/0129740 A1 | 6/2008 | Itagaki et al. | |
| 2008/0140771 A1 | 6/2008 | Vass et al. | |
| 2008/0144880 A1 | 6/2008 | DeLuca | |
| 2008/0147781 A1 * | 6/2008 | Hopmann | G06F 17/30578 709/203 |
| 2008/0177964 A1 * | 7/2008 | Takahashi | G06F 11/1466 711/162 |
| 2008/0259086 A1 | 10/2008 | Doi et al. | |
| 2008/0260297 A1 | 10/2008 | Chung et al. | |
| 2008/0263154 A1 * | 10/2008 | Van Datta | A63F 13/12 709/205 |
| 2008/0270979 A1 | 10/2008 | McCool et al. | |
| 2009/0003542 A1 * | 1/2009 | Ramanathan | H04L 51/14 379/88.13 |
| 2009/0052542 A1 | 2/2009 | Romanovskiy et al. | |
| 2009/0066706 A1 | 3/2009 | Yasue et al. | |
| 2009/0074052 A1 | 3/2009 | Fukuhara et al. | |
| 2009/0083263 A1 | 3/2009 | Felch et al. | |
| 2009/0089462 A1 * | 4/2009 | Strutt | 710/16 |
| 2009/0150555 A1 | 6/2009 | Kim et al. | |
| 2009/0150556 A1 | 6/2009 | Kim et al. | |
| 2009/0187654 A1 * | 7/2009 | Raja | H04L 63/0272 709/224 |
| 2009/0265396 A1 | 10/2009 | Ram et al. | |
| 2010/0060651 A1 | 3/2010 | Gala | |

OTHER PUBLICATIONS

Kim et al., U.S. Appl. No. 11/951,712, Office Action Communication, Sep. 9, 2009, 26 pages.

(56) References Cited

OTHER PUBLICATIONS

Kim et al., U.S. Appl. No. 11/940,470, Office Action Communication, Nov. 18, 2009, 31 pages.
PCT Search Report, International Application No. PCT/EP2008/054331, Oct. 4, 2008, 10 pages.
Kim et al., U.S. Appl. No. 11/940,470, Office Action Communication, Jun. 9, 2010, 26 pages.
Kim et al., U.S. Appl. No. 11/940,506, Office Action Communication, May 14, 2010, 16 pages.
Chung et al., U.S. Appl. No. 11/738,711, Office Action Communication, Jun. 25, 2010, 26 pages.
Chung et al., U.S. Appl. No. 11/738,723, Office Action Communication, Jun. 24, 2010, 26 pages.
Kim et al., U.S. Appl. No. 11/951,712, Office Action Communication, Jul. 23, 2010, 25 pages.
Tiv, U.S. Appl. No. 11/951,712, Office Action Communication, Apr. 26, 2011, 20 pages.
Tsai, U.S. Appl. No. 11/738,711, Office Action Communication, May 23, 2011, 16 pages.
Tsai, U.S. Appl. No. 11/738,723, Office Action Communication, May 23, 2011, 16 pages.
Tsung Yin Tsai, U.S. Appl. No. 11/738,711, Office Action Communication, Feb. 18, 2011, 17 pages.
Tsung Yin Tsai, U.S. Appl. No. 11/738,723, Office Action Communication, Feb. 18, 2011, 17 pages.
Cosby, Lawrence V., U.S. Appl. No. 11/940,470, Office Action Communication, Mar. 4, 2011, 22 pages.
Yang, Qian, U.S. Appl. No. 11/877,926, Office Action Communication, Mar. 23, 2011, 32 pages.
Bitar, Nancy, U.S. Appl. No. 11/782,170, Office Action Communication, Mar. 17, 2011, 19 pages.
Yang, Qian, U.S. Appl. No. 11/767,728, Office Action Communication, Mar. 15, 2011, 34 pages.
Yang, U.S. Appl. No. 11/767,728, Office Action Communication, Jul. 28, 2011, 32 pages.
Tsung Yin Tsai, "PTO Office Action", U.S. Appl. No. 11/738,711, Notification Date: Nov. 9, 2010, 13 pages.
Do, U.S. Appl. No. 11/668,875, Notice of Allowance & Fees Due, Aug. 13, 2010, 9 pages.
Do, U.S. Appl. No. 11/668,875, Notice of Allowance & Fees Due, Sep. 20, 2010, 8 pages.
Tsai, U.S. Appl. No. 11/738,723, Office Action Communication, Nov. 17, 2010, 13 pages.
Doi, U.S. Appl. No. 11/767,728, Office Action Communication, Nov. 19, 2010, 25 pages.
Ansari, U.S. Appl. No. 11/940,506, Office Action Communication, Oct. 29, 2010, 21 pages.
Cosby, U.S. Appl. No. 11/940,470, Office Action Communication, Nov. 26, 2010, 19 pages.
Yang, U.S. Appl. No. 11/877,926, Office Action Communication, Nov. 22, 2010, 33 pages.
Tiv, U.S. Appl. No. 11/951,712, Office Action Communication, Jan. 5, 2011, 18 pages.
Kuhnen, PCT / EP2008 / 050443, Invitation to Pay Additional Fees, Apr. 25, 2008, 6 pages.
Eveno, PCT / EP2008 / 050443, International Search Report, Jul. 22, 2008, 5 pages.
Cussac, PCT / EP2008 / 050443, PCT International Preliminary Report on Patentability, Aug. 4, 2009, 8 pages.
Bitar, U.S. Appl. No. 11/782,170, Office Action Communication, Sep. 16, 2011, 21 pages.
Tsai, U.S. Appl. No. 11/738,711, Office Action Communication, Sep. 23, 2011, 20 pages.
Tsai, U.S. Appl. No. 11/738,723, Office Action Communication, Sep. 27, 2011, 20 pages.
Tiv, U.S. Appl. No. 11/951,712, Office Action Communication, Oct. 21, 2011, 27 pages.
Yang, U.S. Appl. No. 11/767,728, Office Action Communication, Oct. 28, 2011, 33 pages.
Tsai, U.S. Appl. No. 11/738,723, Office Action Communication, Nov. 4, 2011, 15 pages.
Entezari, U.S. Appl. No. 12/028,073, Office Action Communication, Dec. 2, 2011, 51 pages.
Tsai, U.S. Appl. No. 11/738,711, Office Action Communication, Nov. 4, 2011, 14 pages.
Cosby, U.S. Appl. No. 11/940,470, Office Action Communication, Dec. 22, 2011, 41 pages.
Yang, U.S. Appl. No. 11/877,926, Office Action Communication, Jan. 4, 2012, 40 pages.
Yang, U.S. Appl. No. 11/767,728, Office Action Communication, Aug. 10, 2012, 41 pages.
Yang, U.S. Appl. No. 11/877,926, Office Action Communication, Aug. 10, 2012, 47 pages.
Yang, U.S. Appl. No. 11/767,728, Office Action Communication, Feb. 16, 2012, 33 pages.
Bitar, U.S. Appl. No. 11/782,170, Notice of Allowance and Fees Due, Feb. 21, 2012, 20 pages.
Entezari, U.S. Appl. No. 12/028,073, Notice of Allowance & Fees Due, Mar. 21, 2012, 18 pages.
Yang, U.S. Appl. No. 11/877,926, Office Action Communication, Apr. 27, 2012, 32 pages.
Yang, U.S. Appl. No. 11/767,728, Office Action Communication, May 21, 2012, 49 pages.
Tsai, U.S. Appl. No. 11/738,711, Notice of Allowance & Fees Due, May 25, 2012, 5 pages.
Tsai, U.S. Appl. No. 11/738,723, Notice of Allowance & Fees Due, May 25, 2012, 31 pages.
Kim, U.S. Appl. No. 12/057,942, Office Action Communication, Jun. 7, 2012, 58 pages.
Yang, U.S. Appl. No. 11/877,926, Office Action Communication, Mar. 1, 2013, 37 pages.
U.S. Appl. No. 11/940,506, Notice of Allowance dated May 11, 2015, (IBME-0465), 12 pages.
U.S. Appl. No. 11/940,506, Office Action, May 8, 2014, 90 pages.
Yang, U.S. Appl. No. 11/877,926, Office Action Communication, Jun. 26, 2013, 42 pages.
Patel, U.S. Appl. No. 12/057,942, Notice of Allowance & Fees Due, Oct. 10, 2012, 18 pages.
Yang, U.S. Appl. No. 11/877,926, Notice of Allowance & Fees Due, IBME-0467, Oct. 18, 2013, 12 pages.
Yang, U.S. Appl. No. 11/767,728 , Notice of Allowance & Fees Due, 111/15/2012, 15 pages.
Cosby, U.S. Appl. No. 11/940,470,Examiner's Answers , Nov. 16, 2012, 36 pages.
Yang, U.S. Appl. No. 11/877,926, Final Office Action, Nov. 30, 2012, 43 pages.
U.S. Appl. No. 11/940,506, Final Office Action 2 dated Dec. 17, 2014, (IBME-0465), 17 pages.

\* cited by examiner

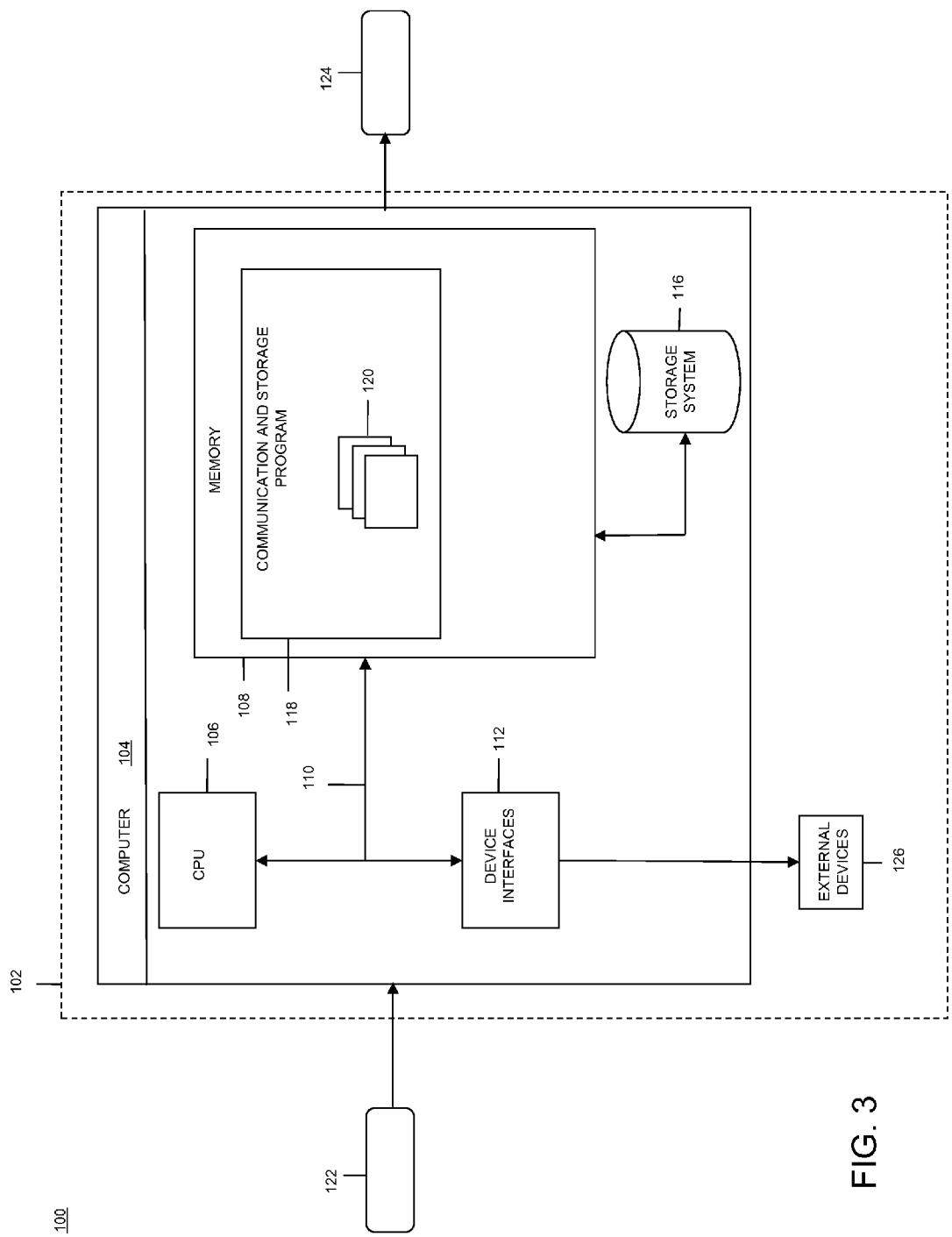

MEMORY TO MEMORY COMMUNICATION AND STORAGE FOR HYBRID SYSTEMS

CROSS-REFERENCE TO RELATED APPLICATIONS

This application is related in some aspects to commonly owned and co-pending patent application Ser. No. 11/951,712, entitled "MEMORY TO STORAGE COMMUNICATION FOR HYBRID SYSTEMS", filed concurrently herewith, the entire contents of which are herein incorporated by reference. This application is related in some aspects to commonly owned and co-pending patent application Ser. No. 11/940,506, entitled "SERVER-PROCESSOR HYBRID SYSTEM FOR PROCESSING DATA", filed Nov. 15, 2007, the entire contents of which are herein incorporated by reference. This application is related in some aspects to commonly owned and co-pending patent application Ser. No. 11/940,470, entitled "PROCESSOR-SERVER HYBRID SYSTEM FOR PROCESSING DATA", filed Nov. 15, 2007, the entire contents of which are herein incorporated by reference.

FIELD OF THE INVENTION

The present invention generally relates to data communication and storage. Specifically, the present invention relates to a memory to memory data communication and storage within a hybrid system.

BACKGROUND OF THE INVENTION

Web 1.0 is historically referred to as the World Wide Web, which was originally about connecting computers and making technology more efficient for computers. Web 2.0/3.0 is considered to encompass the communities and social networks that build contextual relationships and facilitates and knowledge sharing and virtual web servicing. Traditional web service can be thought of as a very thin client. That is, a browser displays images relayed by a server, and every significant user action is communicated to the front-end server for processing. Web 2.0 is a social interaction that is consisted of the software layer on the client, so the user gets quick system response. The back-end storage and retrieval of data is conducted asynchronously in the background, so the user doesn't have to wait for the network. Web 3.0 is geared towards the 3 dimensional vision such as in virtual universes. This could open up new ways to connect and collaborate using 3D shared environments. Along these lines, web 3.0 describes the evolution of Web usage and interaction along several separate paths. These include transforming the Web into a database and a move towards making content accessible by multiple non-browser applications. Prior to the inception of the above incorporated patent applications, no approach provided a system that efficiently accommodated web 3.0.

SUMMARY OF THE INVENTION

The present invention leverages the server-cell and cell-server based hybrid systems incorporated above to provide an approach for memory to memory communication and storage of data. Specifically, under the present invention, a hybrid system having multiple computing devices is provided. The "multiple computing devices" typically include at least one server (a system z server) and at least one processor (such as that in a cell blade or the like), both of which include local memory (system z, cell, cell blade, and related terms are trademarks of IBM Corp. in the United States and/or other countries). Thus, the hybrid system will typically have at least two different types of computing devices.

When a data stream is received by either type of computing device, the receiving computing device will first determine if the data stream or any portion thereof can be stored in its local memory. This determination is made based on a per stream limit and a total storage limit of the receiving computing device. If any portion of the data stream cannot be so stored, the data stream or any portion thereof (such as the portion that cannot be stored locally), can be communicated for storage in local memory of another computing device in the hybrid system. This further based upon a per stream limit and a total storage limit of the other computing device. To accomplish such communication and storage of the data stream (or portion thereof), a control signal will be sent between the two computing devices either as a unified communications signal with the data stream, or as multiple independent communications signals.

A first aspect of the present invention provides a method for memory to memory communication and storage for hybrid systems, comprising: receiving a data stream on a first computing device of a hybrid system; attempting to store the data stream on the first computing device up to a per stream limit and a total storage limit of the first computing device; determining whether to store at least a portion of the data stream on a second computing device of the hybrid system that is in communication with the first computing device, the determining being based on the per stream limit and the total storage limit of the first computing device as well as a per stream limit and a total storage limit of the second computing device; and communicating the at least a portion of the data stream and a control signal to the second computing device to cause storage of the portion on the second computing device.

A second aspect of the present invention provides a system for memory to memory communication and storage for hybrid systems, comprising: a module for receiving a data stream on a first computing device of a hybrid system; a module for attempting to store the data stream in a local memory of the first computing device up to a per stream limit and a total storage limit of the first computing device; a module for determining whether to store at least a portion of the data stream in a local memory of a second computing device of the hybrid system that is in communication with the first computing device, the module for determining being configured to determine store the at least a portion of the data stream on the second computing device based on the per stream limit and the total storage limit of the first computing device as well as a per stream limit and a total storage limit of the second computing device; and a module for communicating the at least a portion of the data stream and a control signal to the second computing device to cause storage of the at least a portion of the data stream in the local memory of the second computing device.

A third aspect of the present invention provides a program product stored on a computer readable medium for memory to memory communication and storage for hybrid systems, the computer readable medium comprising program code for causing a computer system to: receive a data stream on a first computing device of a hybrid system; attempt to store the data stream on the first computing device up to a per stream limit and a total storage limit of the first computing device; make a determination to store at least a portion of the data stream on a second computing device of the hybrid system that is in communication with the first computing device, the determination being based on the per stream limit and the total storage limit of the first computing device as well as a per stream limit and a total storage limit of the second computing device;

and communicate the at least a portion of the data stream and a control signal to the second computing device to cause storage of the portion on the second computing device.

A fourth aspect of the present invention provides a method for deploying a system for memory to memory communication and storage for hybrid systems, comprising: providing a computer infrastructure being operable to: receive a data stream on a first computing device of a hybrid system; attempt to store the data stream on the first computing device up to a per stream limit and a total storage limit of the first computing device; make a determination to store at least a portion of the data stream on a second computing device of the hybrid system that is in communication with the first computing device, the determination being based on the per stream limit and the total storage limit of the first computing device as well as a per stream limit and a total storage limit of the second computing device; and communicate the at least a portion of the data stream and a control signal to the second computing device to cause storage of the portion on the second computing device.

A fifth aspect of the present invention provides a data processing system for memory to memory communication and storage for hybrid systems, comprising: a memory medium having instructions; a bus coupled to the memory medium; and processing unit coupled to the bus that when executing the instructions causes the data processing system to: receive a data stream on a first computing device of a hybrid system; attempt to store the data stream on the first computing device up to a per stream limit and a total storage limit of the first computing device; make a determination to store at least a portion of the data stream on a second computing device of the hybrid system that is in communication with the first computing device, the determination being based on the per stream limit and the total storage limit of the first computing device as well as a per stream limit and a total storage limit of the second computing device; and communicate the at least a portion of the data stream and a control signal to the second computing device to cause storage of the portion on the second computing device.

BRIEF DESCRIPTION OF THE DRAWINGS

These and other features of this invention will be more readily understood from the following detailed description of the various aspects of the invention taken in conjunction with the accompanying drawings in which:

FIG. 3 depicts a more specific computerized implementation according to the present invention.

Figure 1:
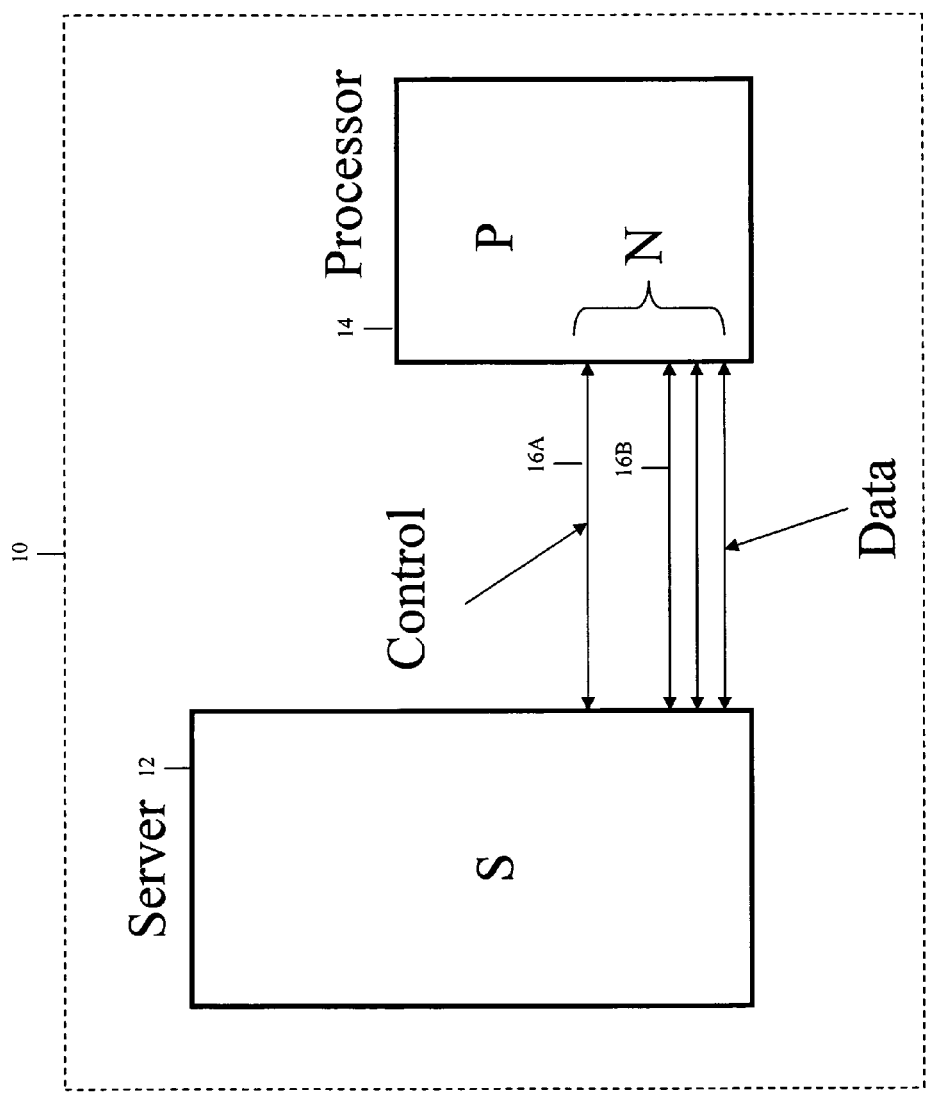
FIG. 1 depicts communication within a hybrid system according to one embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience, the Detailed Description of the Invention has the following Sections:

I. General Description
II. Computerized Implementation

I. General Description

The present invention leverages the server-cell and cell-server based hybrid systems incorporated above to provide an approach for memory to memory communication and storage of data. Specifically, under the present invention, a hybrid system having multiple computing devices is provided. The "multiple computing devices" typically include at least one server (a system z server) and at least one processor (a cell processor), both of which include local memory (system z, cell, cell blade, and related terms are trademarks of IBM Corp. in the United States and/or other countries). Thus, the hybrid system will typically have at least two different types of computing devices.

When a data stream is received by either type of computing device, the receiving computing device will first determine if the data stream or any portion thereof can be stored in its local memory. This determination is made based on a per stream limit and a total storage limit of the receiving computing device. It will be understood that this encompasses scenarios where multiple receiving devices are pooled together and "local" memory in this case refers to "pooled" aggregate memory of all receiving devices e.g. "pooled" memory of cell blades in a blade chassis. If any portion of the data stream cannot be so stored, the data stream or any portion thereof (such as the portion that cannot be stored locally), can be communicated for storage in local memory of another computing device in the hybrid system. This further based upon a per stream limit and a total storage limit of the other computing device. To affect such communication and storage of the data stream (or portion thereof), a control signal will be sent between the two computing devices either as a unified communications signal with the data stream, or as multiple independent communication signals.

Referring now to FIG. 1, a hybrid system 10 is shown. As depicted, hybrid system 10 includes a server 12 (also referred herein to as "S") and a processor 14 (also referred to herein as "P"). It is understood that processor 14 is likely incorporated within computer or the like). As indicated above, when a data stream is received by either server 12 or processor 14, the receiving computing device will determine whether sufficient space exists in its local memory to store the stream. If not, the receiving computing device will communicate the entire stream, or at least the portion that does not fit in its' local memory to another computing device within hybrid system 10. The determination of where to store data is typically based on the following factors: the per stream limit and the total storage limit of the receiving computing device, as well as a per stream limit and a total storage limit of the second computing device.

It should be understood that the data stream can originate from many possible locations in accordance with the present invention. For example the data stream may be received at either computing device from private tertiary storage (e.g., disk(s)) of the first computing device, the second computing device etc. Moreover, such private tertiary storage(s) can be used to supplement stream store for received streams at either computing device.

Figure 2:
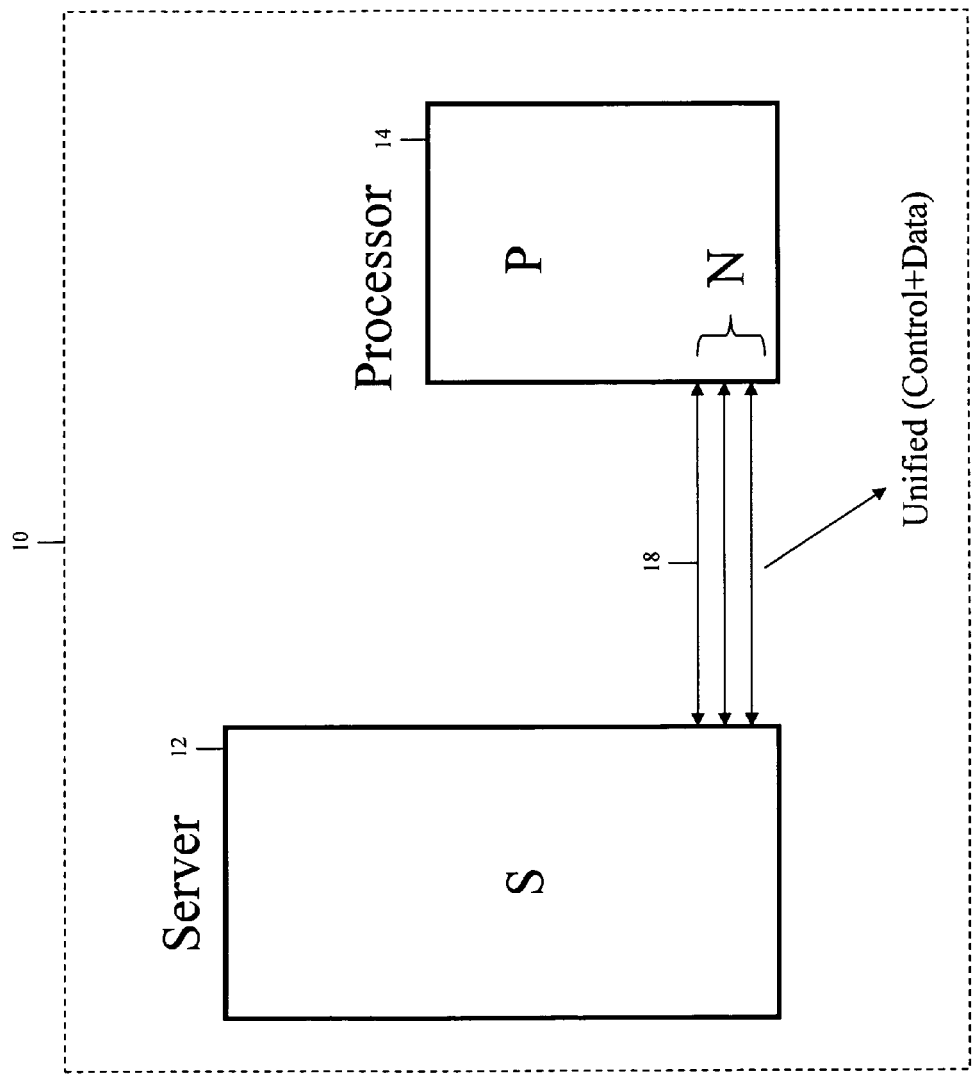
FIG. 2 depicts communication within a hybrid system according to another embodiment according to the present invention.

Regardless, in communicating the data, two types of communication occur, a control signal providing instructions for storage of the data, and the data stream itself. As shown in FIG. 1, multiple separate control signals 16A-B are communicated between server 12 and processor 14. However, this need not be the case. For example, referring to FIG. 2, a unified signal is provided. Thus, FIGS. 1 and 2 show that any number of signals coupled be accommodated within the scope of the present invention. The determination of whether a unified data path (shown in FIG. 2) or separate data paths can be made at set up time. The format used can be either a push or pull. In any event, these and other features will be further discussed below.

Data can arrive from either end—S or P

Choice of split control and data path or unified control or data path is made during system setup time (depending on workloads to be handled by system)

S and P can communicate using Push or Pull

Choice of push or pull Is made dynamically during communication time using model selection algorithm Under the present invention, both a push model and a pull model can be used. Control messages can be sent across a separate control path with data messages being sent over the regular data path as shown in FIG. 1 and is called "split communication path". Here two separate connection IDs are needed. Control messages can also be sent along with data messages across the same path as shown in FIG. 2 and is called "unified communication path". In this case, only one connection ID is needed. Both Push and Pull communication can be realized for separate or unified data path and control path. The push model is useful for short data where latency is a concern. Control messages usually have latency bounds for data transfer. This requires engagement of the data source computer processor until all the data is "pushed" out. The pull model is usually useful for bulk data where the destination computer can read data directly from the source's memory without involving the source's processor. Here the latency of communicating the location and size of the data from the source to the destination can easily be amortized over the whole data transfer. In a typical embodiment of this invention, push and pull model can be invoked selectively depending on the length of data to be exchanged.

The following steps show how the push and pull models work:

Dynamic Model Selection (1) S and P want to communicate. Sender (S or P) makes the following decisions—

Step 1—Is data of predefined length and less than Push Threshold (PT)?

Step 2—If yes, then employ "push"

Step 3—if no, then data is of streaming nature without any known size. S "shoulder taps" P with location address of data. Push Threshold (PT) is a parameter that can be chosen for a given application or data type (fixed length or stream) by the designer of the system.

Push Model

1) S shoulder taps P with data block size (if known).
2) S looks up application communication rate requirements (R).
3) S looks up number of links in "link aggregation pool" (N).
4) S matches R and N by expanding or shrinking N [dynamic allocation].
5) S and P agree on number of links required for data transfer
6) S pushes data to P.
7) S can close connection in the following ways—when all data is sent (size known) & when job is complete.
8) S closes connection by shoulder tap to P.

Pull Model

1) S shoulder taps P with data block size (if known).
2) S looks up application communication rate requirements (R).
3) S looks up # of links in "link aggregation pool" (N).
4) S matches R and N by expanding or shrinking N [dynamic allocation].
5) S and P agree on number of links required for data transfer
6) P pulls data from S memory.
7) S can close connection in the following ways—when all data is sent (size known) & when job is complete.
8) S closes connection by shoulder tap to P Within the teachings herein, the present invention is also capable of communication by way of local memory copy for bandwidth savings. Along these lines, consider the steps of the pull model set forth above. Assume that data is received at S and S needs P memory to store received data. The memory of P consists of memory required for P's workload processing and memory needed to support S. If P requires data from S and if that data is contained in S memory physically located on P, then this data can be delivered by "local" address space copy. In order to achieve this, at step 6, S communicates the (starting address, length) pair ("pointer") to P from S by direct communication over the control links. P can then copy directly from S memory (which is physically co-located with P) using the "pointer". This is an operation local to P and does not require any external link bandwidth from P to S. It will be understood that the actual data does not need to be forwarded from S to P and only a "pojnter" to data is communicated over the control links. Similar bandwidth gain can be realized for the pull model at step 6 by providing a "pointer" to P so that P can complete a "local" copy.

II. Computerized Implementation

Referring now to FIG. 3, a computerized implementation 100 of the present invention is shown. As depicted, implementation 100 includes computing device 104 deployed within a computer infrastructure 102. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets—based protocol, and an Internet service provider could be used to establish connectivity to the Internet. Still yet, computer infrastructure 102 is intended to demonstrate that some or all of the components of implementation 100 could be deployed, managed, serviced, etc. by a service provider who offers to implement, deploy, and/or perform the functions of the present invention for others. It should be understood that computing device is intended to represents any device of hybrid system 10 (FIGS. 1-2). That is, computing device 104 can be a server or a processor. In addition, although not shown, it should be understood the hybrid system will include multiple computing devices.

As shown, computing device 104 includes a processing unit 106, a memory 108, a bus 110, and device interfaces 112. Further, computing device 104 is shown having image capture device 22 and storage system 116 that communicate with bus via device interfaces (although image capture device 22 alternatively could directly communicate with bus 110). In general, processing unit 106 executes computer program code, such as checkout software/program 24, which is stored in memory 108 and/or storage system 116. While executing computer program code, processing unit 106 can read and/or write data to/from memory 108, storage system 116, and/or device interfaces 112. Bus 110 provides a communication link between each of the components in computing device 104. Although not shown, computing device 104 could also include I/O interfaces that communicate with: one or more external devices such as a kiosk, a checkout station, a keyboard, a pointing device, a display, etc.); one or more devices that enable a user to interact with computing device 104; and/or any devices (e.g., network card, modem, etc.) that enable computing device 104 to communicate with one or more other computing devices.

Computer infrastructure 102 is only illustrative of various types of computer infrastructures for implementing the invention. For example, in one embodiment, computer infrastructure 102 comprises two or more computing devices (e.g., a server cluster) that communicate over a network to perform the various process of the invention. Moreover, computing device 104 is only representative of various possible computer systems that can include numerous combinations of hardware. To this extent, in other embodiments, computing device 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 106 may comprise a single processing unit, or be distributed across one or more processing units in one or more locations, e.g., on a client and server. Similarly, memory 108 and/or storage system 116 can comprise any combination of various types of data storage and/or transmission media that reside at one or more physical locations. Further, device interfaces 112 can comprise any module for exchanging information with one or more external devices 126. Still further, it is understood that one or more additional components (e.g., system software, math co-processing unit, etc.) not shown in FIG. 3 can be included in computing device 104.

Storage system 116 can be any type of system capable of providing storage for information under the present invention. To this extent, storage system 116 could include one or more storage devices, such as a magnetic disk drive or an optical disk drive. In another embodiment, storage system 116 includes data distributed across, for example, a local area network (LAN), wide area network (WAN) or a storage area network (SAN) (not shown). In addition, although not shown, additional components, such as cache memory, communication systems, system software, etc., may be incorporated into computing device 104.

Shown in memory 108 of computing device 104 is communication and storage program 118, with a set of modules 120. The modules generally provide the functions of the present invention as described herein. Specifically (among other things), set of modules 120 is configured to: receive a data stream 122 on a first computing device of a hybrid system; attempt to store the data stream on the first computing device up to a per stream limit and a total storage limit of the first computing device; make a determination to store at least a portion 124 of the data stream 122 on a second computing device of the hybrid system that is in communication with the first computing device, the determination being based on the per stream limit and the total storage limit of the first computing device as well as a per stream limit and a total storage limit of the second computing device; and communicate the at least a portion 124 of the data stream and a control signal to the second computing device to cause storage of the at least a portion 124 on the second computing device. It will be understood that each computing device may use private storage 116, considered as part of the memory hierarchy of a computer system to store data. The OS (Operating System) will automatically store data from solid-state memory 108 when 108 reaches memory capacity using virtual memory management algorithms. Set of modules 120 can also be configured to: analyze the volume of data streams and make decisions with respect to communication and storage of data in light of capacity and per stream limits a computing device might have, register discrepancies where item lists cannot be verified by their appearance and/or weight, communicate notifications, arrange payment for verified items, etc.

While shown and described herein as memory to memory storage, it is understood that the invention further provides various alternative embodiments. For example, in one embodiment, the invention provides a computer-readable/useable medium that includes computer program code to enable a computer infrastructure to provide memory to memory storage. To this extent, the computer-readable/useable medium includes program code that implements each of the various process of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 108 (FIG. 3) and/or storage system 116 (FIG. 3) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process of the invention on a subscription, advertising, and/or fee basis. That is, a service provider, such as a Solution Integrator, could offer to provide memory to memory storage. In this case, the service provider can create, maintain, support, etc., a computer infrastructure, such as computer infrastructure 102 (FIG. 3) that performs the process of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for memory to memory storage. In this case, a computer infrastructure, such as computer infrastructure 102 (FIG. 3), can be provided and one or more systems for performing the process of the invention can be obtained (e.g., created, purchased, used, modified, etc.) and deployed to the computer infrastructure. To this extent, the deployment of a system can comprise one or more of: (1) installing program code on a computing device, such as computing device 104 (FIG. 3), from a computer-readable medium; (2) adding one or more computing devices to the computer infrastructure; and (3) incorporating and/or modifying one or more existing systems of the computer infrastructure to enable the computer infrastructure to perform the process of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic device system/driver for a particular computing and/or device, and the like.

A data processing system suitable for storing and/or executing program code can be provided hereunder and can include at least one processor communicatively coupled, directly or indirectly, to memory element(s) through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or device devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems and Ethernet cards.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A method for memory to memory communication and storage for hybrid systems, comprising:
   receiving a data stream on a first computing device of a hybrid system;
   attempting to store the data stream on the first computing device up to a per stream limit and a total storage limit of the first computing device;
   determining whether to store a portion of the data stream on a second computing device of the hybrid system that is in communication with the first computing device, the determining being based on the per stream limit and the total storage limit of the first computing device as well as a per stream limit and a total storage limit of the second computing device;
   communicating a control signal to the second computing device to provide instructions for storage of the portion of the received data stream onto the second computing device; and
   communicating the portion of the received data stream to the second computing device to cause storage of the portion of the received data stream on the second computing device, wherein a remaining portion of the received data stream is stored on the first computing device.

2. The method of claim 1, the first computing device comprising a processor, and the second computing device comprising a server.

3. The method of claim 1, the first computing device comprising a server, and the second computing device comprising a processor.

4. The method of claim 1, the portion of the data stream and the control signal being transmitted as a unified communication signal.

5. The method of claim 1, the portion and the control signal being transmitted as separate communication signals.

6. The method of claim 1, further comprising performing a local memory copy between memory space of the second computing device and the first computing device to communicate data, each of the memory spaces being physically co-located on the first computing device.

7. The method of claim 1, further comprising performing a local memory copy between memory space of the first computing device and the second computing device to communicate data, each of the memory spaces being physically co-located on the second computing device.

8. The method of claim 1, wherein data stream may be received from private tertiary storage of first computing device at the first computing device.

9. The method of claim 1, wherein data stream may be received from private tertiary storage of second computing device at the second computing device.

10. The method of claim 1, wherein private tertiary storage of first computing device is used to supplement stream store for received streams at the first computing device.

11. The method of claim 1, wherein private tertiary storage of second computing device is used to supplement stream store for received streams at the second computing device.

12. A system for memory to memory communication and storage for hybrid systems, comprising:
    a module for receiving a data stream on a first computing device of a hybrid system;
    a module for attempting to store the data stream in a local memory of the first computing device up to a per stream limit and a total storage limit of the first computing device;
    a module for determining whether to store a portion of the data stream in a local memory of a second computing device of the hybrid system that is in communication with the first computing device, the module for determining being configured to determine store the at least a portion of the data stream on the second computing device based on the per stream limit and the total storage limit of the first computing device as well as a per stream limit and a total storage limit of the second computing device; and
    a module for communicating a control signal to the second computing device to provide instructions for storage of the portion of the received data stream onto the second computing device, and communicating the portion of the received data stream to the second computing device to cause storage of the portion of the received data stream in the local memory of the second computing device, wherein a remaining portion of the received data stream is stored on the first computing device.

13. The system of claim 12, the first computing device comprising a processor, and the second computing device comprising a server.

14. The system of claim 12, the first computing device comprising a server, and the second computing device comprising a processor.

15. The system of claim 12, the portion of the data stream and the control signal being transmitted as a unified communication signal.

16. The system of claim 12, the portion and the control signal being transmitted as separate communication signals.

17. The system of claim 12, further comprising a module for performing a memory copy between the first computing device and the second computing device.

18. A program product stored on a non-transitory computer readable storage medium for memory to memory communication and storage for hybrid systems, the non-transitory computer readable medium comprising program code for causing a computer system to:
receive a data stream on a first computing device of a hybrid system;
attempt to store the data stream on the first computing device up to a per stream limit and a total storage limit of the first computing device;
make a determination to store a portion of the data stream on a second computing device of the hybrid system that is in communication with the first computing device, the determination being based on the per stream limit and the total storage limit of the first computing device as well as a per stream limit and a total storage limit of the second computing device;
communicate a control signal to the second computing device to provide instructions for storage of the portion of the received data stream onto the second computing device;
communicate the portion of the received data stream to the second computing device to cause storage of the portion of the received data stream on the second computing device, wherein a remaining portion of the received data stream is stored on the first computing device.

19. The program product of claim 18, the first computing device comprising a processor, and the second computing device comprising a server.

20. The program product of claim 18, the first computing device comprising a server, and the second computing device comprising a processor.

21. The program product of claim 18, the portion of the data stream and the control signal being transmitted as a unified communication signal.

22. The program product of claim 18, the portion and the control signal being transmitted as separate communication signals.

23. The program product of claim 18, the computer readable medium further comprising from code for causing the computer system to copy perform a memory copy between the first computing device and the second computing device.

24. A method for deploying a system for memory to memory communication and storage for hybrid systems, comprising:
providing a computer infrastructure being operable to:
receive a data stream on a first computing device of a hybrid system;
attempt to store the data stream on the first computing device up to a per stream limit and a total storage limit of the first computing device;
make a determination to store a portion of the data stream on a second computing device of the hybrid system that is in communication with the first computing device, the determination being based on the per stream limit and the total storage limit of the first computing device as well as a per stream limit and a total storage limit of the second computing device;
communicate a control signal to the second computing device to provide instructions for storage of the portion of the received data stream onto the second computing device; and
communicate the portion of the received data stream to the second computing device to cause storage of the portion of the received data stream on the second computing device, wherein a remaining portion of the received data stream is stored on the first computing device.

* * * * *